Oct. 12, 1943.  G. E. DATH  2,331,458
FRICTION SHOCK ABSORBING MECHANISM
Filed Oct. 2, 1941
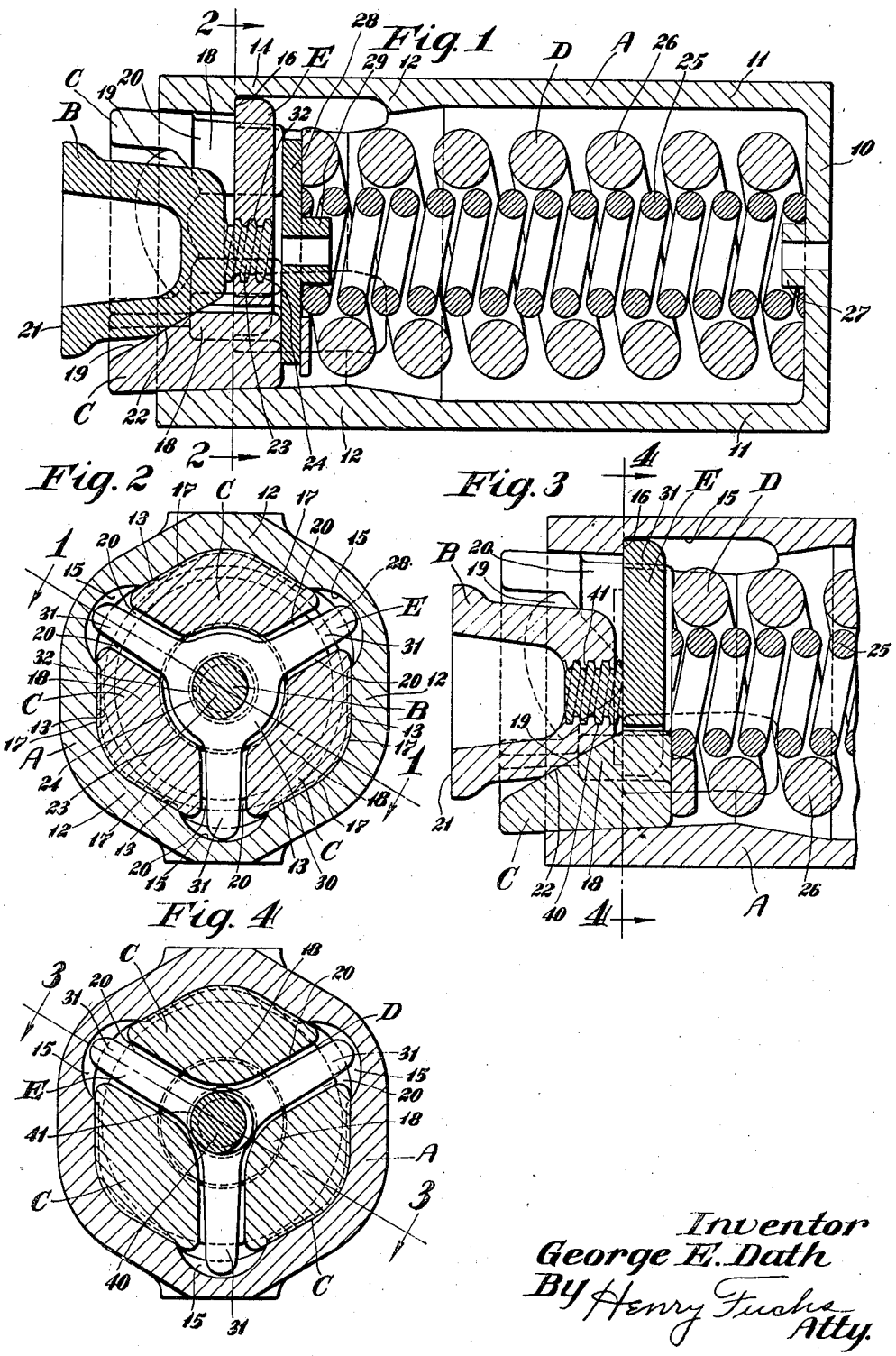
Inventor
George E. Dath
By Henry Fuchs
Atty.

Patented Oct. 12, 1943

2,331,458

UNITED STATES PATENT OFFICE 2,331,458

FRICTION SHOCK ABSORBING MECHANISM

George E. Dath, Mokena, Ill., assignor to W. H. Miner, Inc., Chicago, Ill., a corporation of Delaware Application October 2, 1941, Serial No. 413,263

7 Claims. (Cl. 213—32)

This invention relates to friction shock absorbing mechanisms.

One object of the invention is to provide a friction shock absorbing mechanism especially adapted for railway car draft riggings, including a column element having friction surfaces thereon, and a spring resisted friction clutch cooperating with the column element, the clutch including a combined pressure transmitting and spreading element, wherein simple and efficient readily applied means is provided for anchoring the combined pressure transmitting and spreading element to the column element thereby limiting outward movement of the former and maintaining the parts of the mechanism assembled.

A more specific object of the invention is to provide in a friction shock absorbing mechanism comprising a friction casing having interior friction surfaces, a friction clutch comprising a central wedge and a plurality of friction shoes surrounding the wedge, and a spring within the casing opposing inward movement of the clutch, means for anchoring the wedge to the casing, comprising an anchoring member having shouldered engagement with the casing and a screw threaded connection with the wedge, wherein the wedge is automatically held against rotation with respect to the anchoring member to prevent unscrewing of the wedge from the anchoring member, thus preventing accidental separation and detachment of the wedge from the anchoring member, and also maintaining the screw threaded adjustment of these parts with respect to each other.

A further object of the invention is to provide a mechanism as set forth in the preceding paragraph wherein the shoes and the anchoring member are locked against rotation with respect to the casing and the wedge and shoes are provided with cooperating interengaging wedge faces for producing spreading action of the clutch, and the spring resistance is under initial compression to hold said wedge faces engaged in full release of the mechanism to thereby lock the wedge against rotation with respect to the anchoring member.

Other objects of the invention will more clearly appear from the description and claims hereinafter following.

In the drawing forming a part of this specification, Figure 1 is a longitudinal sectional view of a friction shock absorbing mechanism embodying my improvements, said view corresponding substantially to the line 1—1 of Figure 2. Figure 2 is a transverse vertical sectional view corresponding substantially to the line 2—2 of Figure 1. Figure 3 is a view similar to Figure 1 showing the front end portion of the mechanism and illustrating another embodiment of the invention, said view corresponding to the line 3—3 of Figure 4. Figure 4 is a transverse vertical sectional view corresponding substantially to the line 4—4 of Figure 3.

My improved mechanism, as shown in said drawings, comprises broadly, a friction casing A, a wedge block B, three friction shoes C—C—C, a spring resistance D, and an anchoring element E having a screw threaded connection with the wedge B.

Referring first to the embodiment of the invention illustrated in Figures 1 and 2, the friction casing A is in the form of a shell of hexagonal cross-section, open at its front end, and closed at the rear end by a transverse wall 10. The side walls of the casing are indicated by 11. The side walls 11 are thickened at the front end portion of the casing as indicated at 12 and present six flat, interior friction surfaces 13—13 which converge inwardly and rearwardly of the casing, thereby providing a tapered friction shell portion 14 at the open front end of the casing. At alternate corners of the hexagonal shell 14 the interior walls are provided with longitudinally extending, relatively wide, interior grooves 15—15—15. The front ends of the grooves 15 terminate a short distance inwardly of the front end of the casing, each groove having a substantially flat transverse front end wall 16 which forms a shoulder for limiting outward movement of the anchoring member E, as hereinafter pointed out. The grooves 15 have their front end walls in transverse alignment, and each groove is of a length at least as great as the compression stroke of the mechanism plus the thickness of the anchoring member E.

The friction shoes C, which are three in number, are of substantially V-shaped cross section at their outer sides, each shoe presenting two adjacent flat friction surfaces 17—17, at an angle to each other, cooperating with two adjacent friction surfaces of the casing. The adjacent friction surfaces of the casing with which the shoes cooperate are located between the grooves 15—15 of the casing. Each shoe is laterally, inwardly enlarged as indicated at 18. The enlargement 18 of each shoe is provided with a substantially flat wedge face 19 which cooperates with the wedge B. The wedge faces 19 of the three shoes converge rearwardly and inwardly toward the central longitudinal axis of the mechanism. At the rear end portions thereof the opposed sides of adjacent shoes are recessed or cut away as indicated at 20, for a purpose hereinafter pointed out.

The wedge B is in the form of a block having a flat front end face 21 adapted to bear on the usual main follower of a railway draft rigging. The wedge B is provided with three substantially flat wedge faces 22 correspondingly inclined to and adapted to cooperate with the wedge faces 19 of the shoes. At the inner end the wedge block B has a centrally disposed rearwardly projecting boss or post 23 which is provided with threads 24.

The spring resistance D is disposed within the casing A and comprises inner and outer coils 25 and 26. The rear ends of the coils 25 and 26 bear on the end wall 10 of the casing and the inner coil is held centered by an inwardly projecting hollow boss 27 on the wall 10 which extends into the coil 25.

A spring follower 28 is interposed between the inner ends of the shoes C—C—C and the coil springs 25 and 26 and bears directly respectively on the inner ends of the shoes and the front ends of said springs. The spring follower 28 is provided with a rearwardly projecting boss 29 which engages within the coil 25 of the spring resistance to center the same.

The anchoring member E comprises a central disk-like portion 30, having three equally spaced, radially extending arms 31—31—31. The disk-like portion 30 is provided with a central opening 32 which is provided with screw threads with which the threaded post 23 of the wedge B is engaged.

The arms 31—31—31 of the member E extend into the grooves 15—15—15 of the casing A and are adapted to engage with the shoulders provided by the front end walls of said grooves to restrict outward displacement of said member E. The grooves also limit, to a certain extent, rotation of the element E with respect to the casing by contact with the side edges of said grooves. The arms 31 extend between adjacent shoes C—C and are freely accommodated in the spaces provided by the cut away sections 20 of the shoes.

In assembling the mechanism the springs 25 and 26 are first placed within the casing A, and the spring follower 28 is placed in position on the front ends of the springs. The anchoring member E with the arms thereof in longitudinal alignment with the grooves 15 of the casing A, is then inserted through the open front end of the casing in slightly tilted position so that said arms 31 will clear the corresponding corner portions of the casing. In inserting the member E the same is pressed rearwardly against the springs 25 and 26, compressing the latter, until the arms 31 have cleared the shoulders 16 of the three grooves 15—15—15. The pressure on the member E is then removed, whereupon the expansive action of the springs rights the follower and forces the same forwardly into a position wherein the arms 31—31—31 bear against the shoulders 16—16—16 of the casing A. The shoes C—C—C are then placed in position and forced inwardly to an extent to permit the wedge B to be engaged with the member E by screwing the post 23 into the opening 32. The wedge B is then entered between the shoes while the latter are held in said position and rotated to screw the boss 23 into the opening of the anchoring member E. In screwing the wedge B home the flat wedge faces thereof pass by the flat wedge faces of the shoes. In its final adjusted position the wedge B is so placed that the wedge faces of the same and those of the shoes are in registration. The holding force on the shoes is then released allowing the shoes to return to their outermost position through the action of the springs, and the wedge faces of the shoes seat against the wedge faces of the wedge, thus under pressure of these springs holding the wedge against rotation with respect to the other parts of the mechanism. In order to assure producing this condition slight clearance is normally provided between the anchoring member E and the spring follower 28 by having the rear end of the shoes C project rearwardly beyond the anchoring member.

The operation of the friction shock absorbing mechanism is well known in this art and therefore need not be described in detail, however, it is pointed out that in release of the mechanism, the clutch comprising the wedge B and the shoes C—C—C is forced outwardly by the expansive action of the springs 25 and 26 until the anchoring member E comes into shouldered engagement with the stop shoulders 16 on the casing, thereby positively arresting outward displacement of the wedge B which is secured to the anchoring member. Outward movement of the shoes, in turn, is blocked by the wedge.

As will be evident, as long as the shoes and wedge are held in wedging engagement with each other by the springs 25 and 26, the wedge is yieldingly locked against rotation with respect to the casing and the shoes and cannot become unscrewed from the retaining member E which is held against rotation by the arms thereof being engaged between adjacent shoes which, in turn, are held against rotation with respect to the casing, the interengaged V-shaped faces of the shoes and casing effectively preventing any relative rotation of these parts.

Referring next to the embodiment of the invention illustrated in Figures 3 and 4, the construction is the same as that disclosed in Figures 1 and 2, with the exception that the spring follower is omitted and the screw threaded connection between the wedge B and the anchoring element E is reversed, that is, the anchoring element is provided with a threaded boss or post 40 which is screwed into threaded opening 41 in the wedge B.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing; of a sliding friction clutch telescoped within said casing, said clutch including a wedge block and friction shoes; interengaging wedge faces on said wedge and shoes holding the wedge against rotation about the longitudinal central axis of the casing; a retaining element having shouldered engagement with the shoes to lock said element and shoes against relative rotation about the longitudinal central axis of the mechanism, said element having a screw threaded portion rigid therewith having direct screw threaded engagement with the wedge, said element having shouldered engagement with the casing to restrict outward movement of said retaining element; and spring means within the casing forcing the shoes outwardly against the wedge faces of said wedge.

2. In a friction shock absorbing mechanism, the combination with a friction casing; of a sliding friction clutch telescoped within the casing, said clutch including a wedge block and friction shoes surrounding said block, said shoes and casing having engaging friction surfaces holding said shoes against rotation with respect to the casing; interengaging wedge faces on said wedge and shoes holding the wedge against rotation with respect to said shoes about the longitudinal central axis of the casing; a retaining element held against rotation with respect to the casing, said retaining element having a portion rigid therewith in direct screw threaded engagement with the wedge, said retaining element having shouldered engagement with the casing to restrict outward movement of said retaining element; and spring resistance means within the casing forcing the shoes outwardly against the wedge faces of said wedge.

3. In a friction shock absorbing mechanism, the combination with a friction casing; of a sliding friction clutch telescoped within the casing, said clutch including a wedge block and friction shoes surrounding said block, said shoes and casing having interengaging friction surfaces holding the shoes against rotation about the central longitudinal axis of the casing, said wedge and shoes having interengaging wedge faces holding the wedge against rotation with respect to said shoes about said longitudinal axis; a retaining element having a screw threaded portion rigid therewith in direct screw threaded engagement with the wedge; cooperating means on the retaining element and casing for holding said element against rotation about said longitudinal axis of the casing; shoulders on the casing with which said retaining element has engagement for limiting outward movement of the latter; and spring means within the casing forcing said shoes outwardly against the wedge faces of said wedge.

4. In a friction shock absorbing mechanism, the combination with a friction casing; of a sliding friction clutch telescoped within said casing, said clutch including a wedge block and friction shoes surrounding the wedge block; interengaging wedge faces on said wedge and shoes holding the wedge against rotation with respect to said shoes about the longitudinal central axis of the casing, said shoes and casing having interengaging friction surfaces holding said shoes against rotation about said axis; a retaining element having a screw threaded portion in direct screw threaded connection with a screw threaded portion on the wedge, rigid with the latter, said element having outstanding arms engaged between adjacent shoes to hold said element against rotation about said axis, said arms having shouldered engagement with the casing to limit outward movement of said retaining element; and spring means within said casing opposing inward movement of said shoes, said spring means being under initial compression and normally forcing said shoes outwardly against the wedge faces of said wedge.

5. In a friction shock absorbing mechanism, the combination with a friction casing having interior friction surfaces of V-shaped transverse cross-section; of friction shoes having V-shaped friction surfaces engaged with the friction surfaces of the casing; a wedge block having flat wedge faces engaging flat wedge faces on the shoes; a retaining element having a screw threaded portion rigid therewith to which said wedge is fixed by direct screw threaded engagement with a threaded portion on said wedge which is rigid therewith, said retaining element having arms extending between adjacent shoes, said arms having shouldered engagement with said shoes to hold the retaining element against rotation with respect to said shoes about the longitudinal central axis of the casing, said arms extending beyond the shoes and having shouldered engagement with the casing to limit outward movement of said element; and a spring resistance within the casing, said spring resistance opposing inward movement of the shoes and being under initial compression to force said shoes outwardly against the wedge faces of said wedge.

6. In a friction shock absorbing mechanism, the combination with a friction casing having interior friction surfaces; of a friction clutch telescoped within said casing, said clutch including a wedge member and friction shoes surrounding said wedge, said shoes and wedge having interengaging wedge faces holding said wedge against rotation with respect to said shoes about the longitudinal central axis of the casing; a threaded projection on said wedge rigid with the latter; a retaining element having shouldered engagement with the shoes to hold said element against rotation about said axis with respect to the shoes, said element also having shouldered engagement with the casing to limit outward movement of said retaining element, said retaining element having a threaded opening into which said projection of the wedge is screwed to secure the wedge to said element; and a spring resistance within the casing opposing inward movement of said shoes, said spring resistance being under initial compression and forcing said shoes outwardly to hold the wedge faces thereof engaged with the wedge faces of the wedge.

7. In a friction shock absorbing mechanism, the combination with a friction casing having interior limiting shoulders; of friction shoes slidable within the casing, said shoes and casing having interengaging friction surfaces; a wedge, said wedge and said shoes having interengaging wedge faces for holding said wedge against rotation about the longitudinal central axis of the casing with respect to said shoes, said wedge having an internally threaded central opening; a retaining element having a centrally disposed projecting screw threaded boss rigid therewith screwed into said opening of the wedge, said retaining element having arms engaged between adjacent shoes and in shouldered engagement therewith to hold said element against rotation with respect to said shoes, said arms adapted to engage said casing to limit outward movement of said element; and spring means within the casing opposing inward movement of said shoes, said spring means being under initial compression to hold said shoes engaged with the wedge faces of the wedge.

GEORGE E. DATH.